Aug. 2, 1932.    J. C. HALE    1,869,475
CABLE TERMINAL
Filed Jan. 15, 1930    5 Sheets-Sheet 1
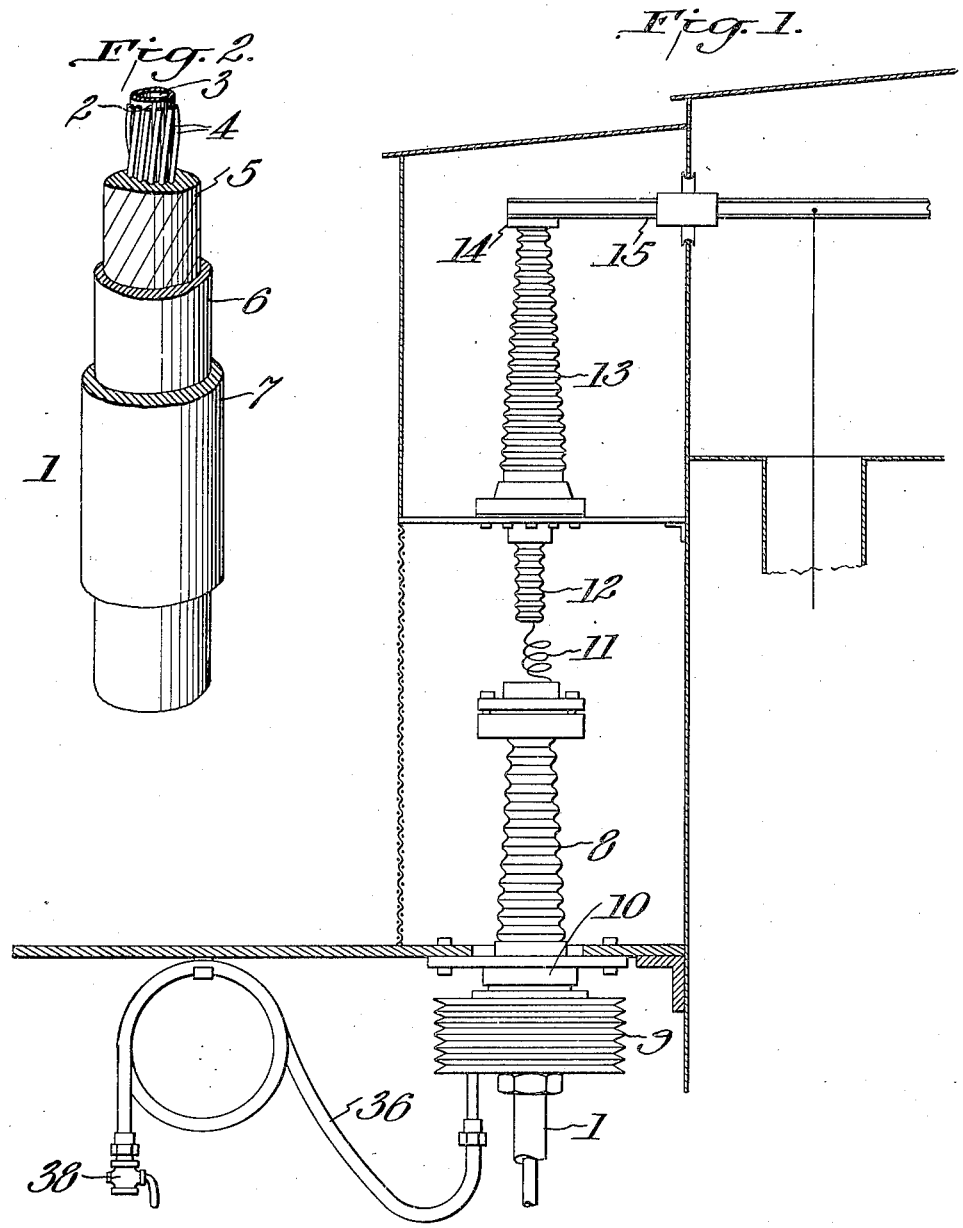
Inventor:
John C. Hale,
By Byrnes Townsend & Potter
Attorneys.

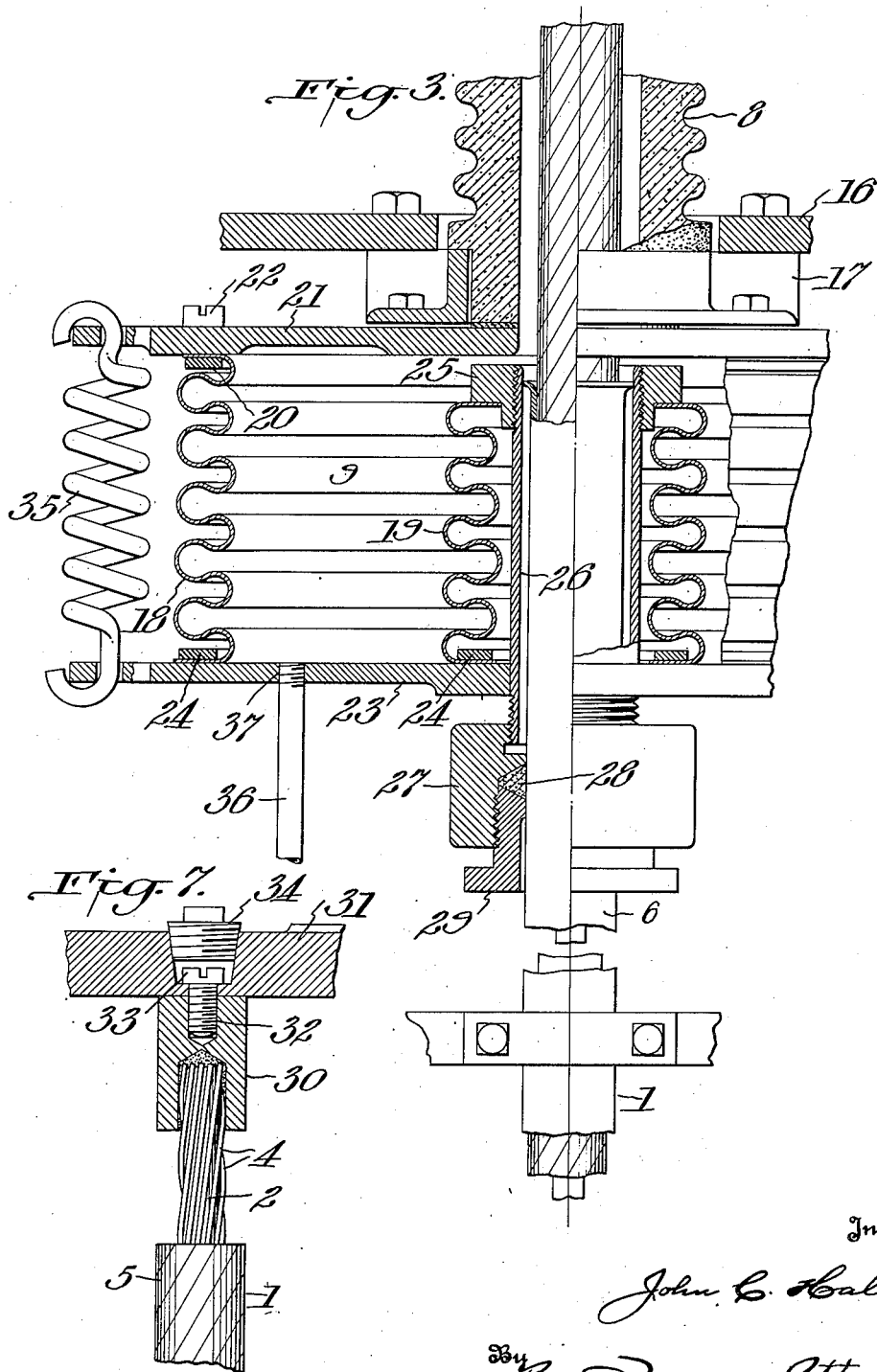

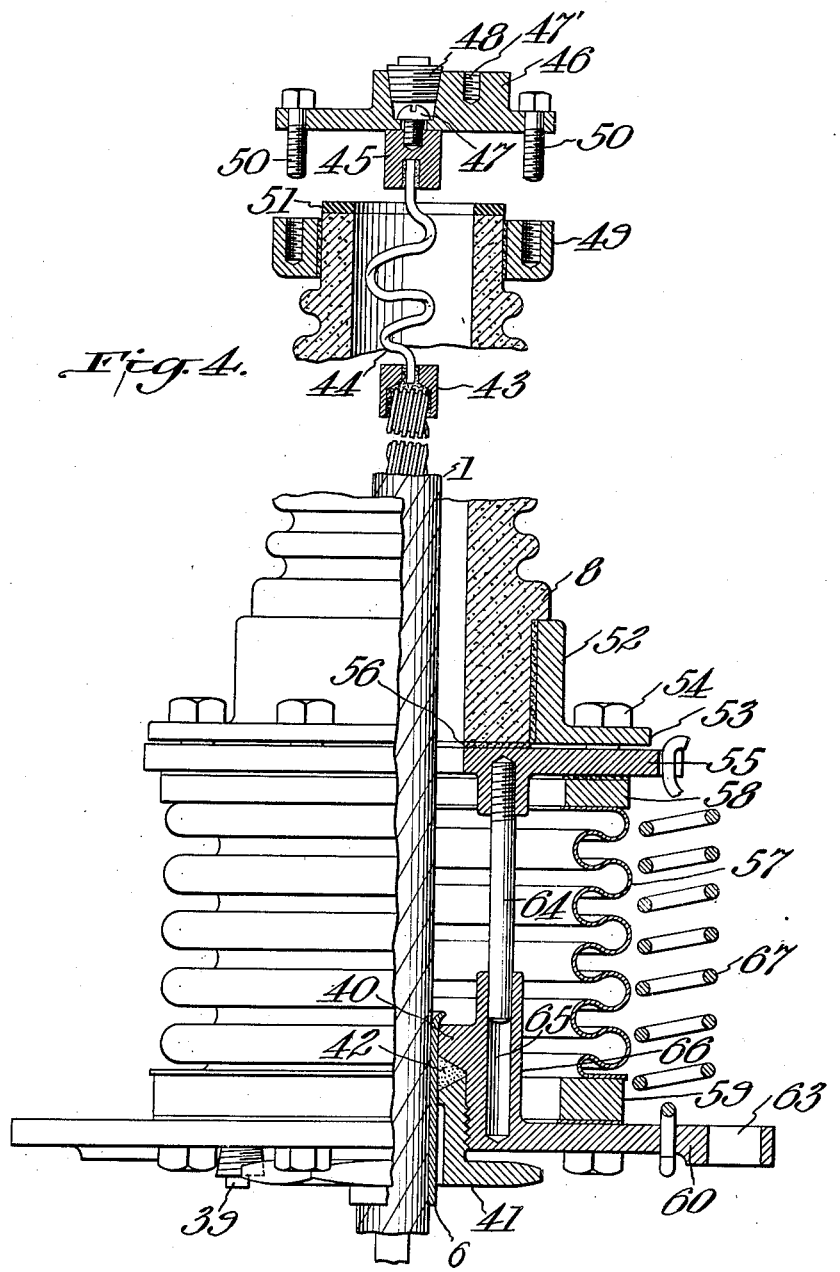

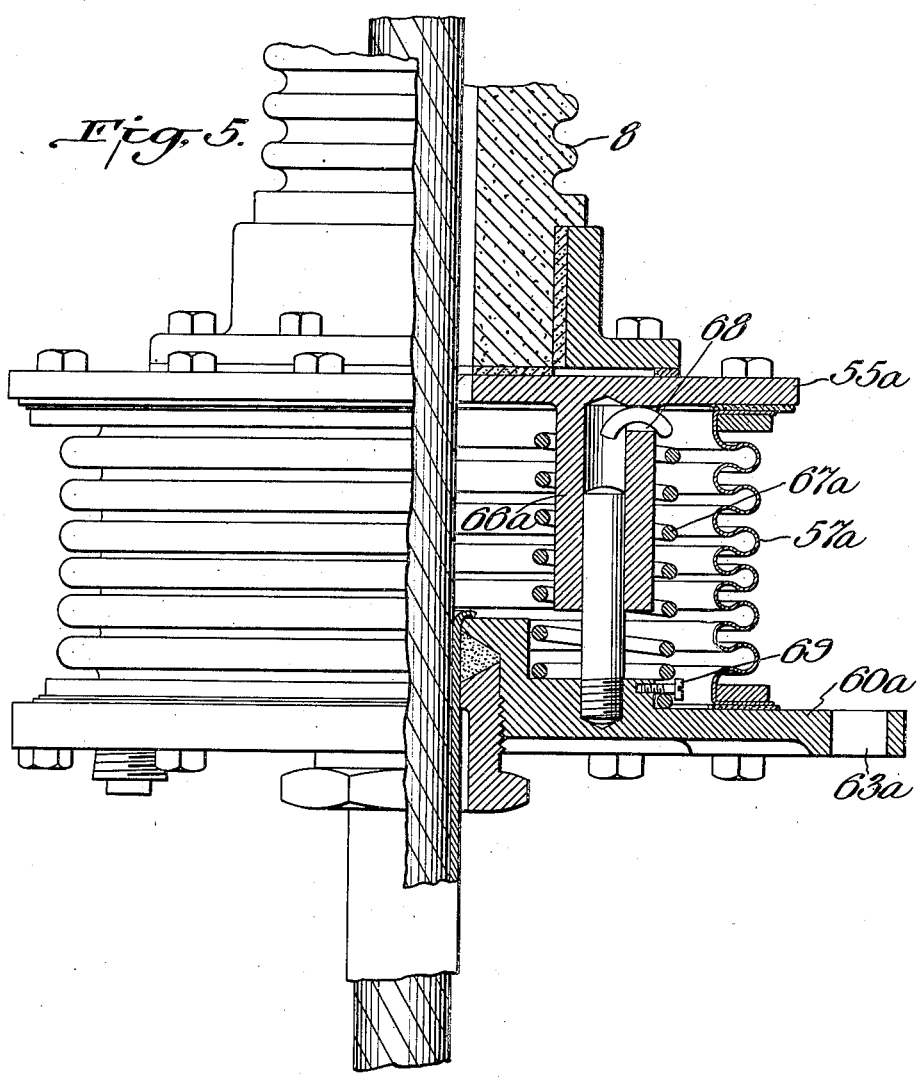

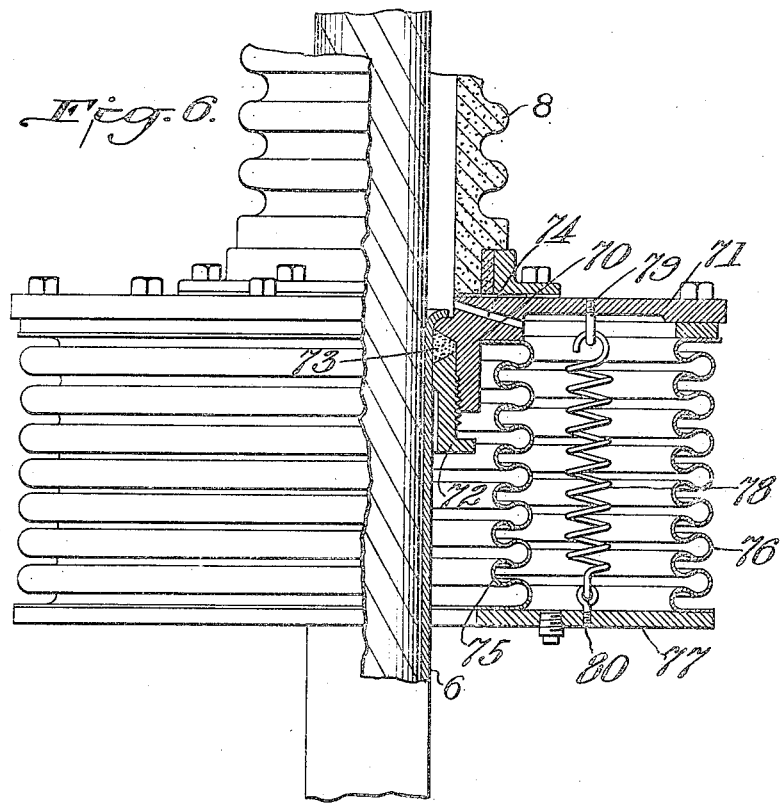

Patented Aug. 2, 1932

1,869,475

UNITED STATES PATENT OFFICE

JOHN C. HALE, OF BOUND BROOK, NEW JERSEY, ASSIGNOR TO RESEARCH CORPORATION, OF NEW YORK, N. Y., A CORPORATION OF NEW YORK

CABLE TERMINAL

Application filed January 15, 1930. Serial No. 421,029.

This invention relates to insulated cables used for the transmission of high voltage current and particularly to hollow cables having an insulating fluid therein and a tank communicating therewith for supplying an excess of insulating fluid to the cable. More particularly, my invention relates to a novel terminal for hollow insulated cables which terminal includes a tank surrounding the cable and having expansible walls and arranged to expand or contract to provide for the expansion and contraction of the insulating fluid within the cable proper.

One of the objects of the invention is to provide improvements in terminals for high voltage cables whereby the conductor can be brought out for external connections in a highly satisfactory manner.

Another object of the invention is to provide a terminal which is especially adaptable to cables which contain a fluid or plastic insulating material and which require a receptacle to hold the surplus fluid which emerges from the cables, due to expansion, when the cables are heated, and to supply fluid to the cables when the fluid in the cables contracts due to low temperatures in the cables.

Formerly it was the practice to provide a receptacle, constructed in the form of yielding metal bellows, adjacent the terminal and to connect it to the hollow cable by means of a conduit. According to my invention, I make the receptacle a part of the terminal base. This construction is compact, rugged, easy to install, and inexpensive to construct.

The invention is illustrated in the drawings in which:

Fig. 1 is an elevation of a high voltage cable terminal showing how the device of my invention is employed in connection with an electrical precipitation installation;

Fig. 2 is a fragmentary view of a cable such as may be used with my invention;

Figs. 3 to 6, inclusive, are partial vertical sections of several forms of my invention; and Fig. 7 is a vertical section of a detail.

To aid in the proper understanding of my invention, the construction of a cable insulated for potentials in excess of 26,000 volts, a portion of which is shown in Figure 1, will be described. In Fig. 2, the cable 1 consists of a fluid-permeable, flexible tube 2, the interior 3 of which is filled with semi-liquid material of high dielectric strength, such as petrolatum. This material may also be an insulating liquid such as oil, or a plastic asphaltic compound, but will be referred to hereafter as a fluid. The conductor 2 has wound about it a number of small flexible wires 4 which are also useful in conducting current. Flexible insulation 5, usually impregnated paper, is wound around the conductors mentioned. A lead protective sheath 6 covers the paper and is usually surrounded by a protective coating 7 of tarred paper or the like. The sheath is connected to ground and is usually protected by armor (not shown). In use, the space 3 within the tube 2 is maintained completely full of the insulating fluid which permeates through the tube 2 between and around the wires 4 and saturates the insulating material 5. In the use of such cables it is advisable to keep the insulating material saturated with the fluid so that it will not dry out and consequently permit air or other gases to be present and so it will not absorb moisture.

Where such a cable is to be connected to a bus bar, switch, or other exposed part, it is necessary to surround the cable end with a fluid-tight cover in order to prevent leakage of the insulating fluid and to make an electrical connection through the top or wall of the cover between the cable end and the bus bar or other external part. It is necessary further to construct the cover in such a manner that the high voltage conductors 2 and 4 are properly insulated from the end of the grounded lead covering 6 and this is usually done by cutting the lead sheath 6 away from the end of the tubular conductor 2 for a distance of from 4" to 12" and making the portion of the cover that surrounds the ends of the conductors 2 and 4 of a porcelain bushing 8. Not only must the cover be maintained full of insulating fluid to insulate the cable end, but some means must be provided to store that portion of the fluid which emerges from the cable due to expansion in warm weather and to permit the fluid to flow back into the cable when a lowering temperature causes volumetric contraction of the fluid. The cover and connecting parts used for the purposes just described make up what is known as a terminal for fluid filled high voltage cables. It is sometimes referred to as a "pothead".

The invention to be described has to do with such a terminal and its principal advantages are the compactness of the apparatus, the convenient manner in which the insulating liquid is maintained in close proximity to the cable, and the means providing for expansion and contraction. While it is not new to provide a reservoir of fluid near the cable end and to have the walls of the reservoir of flexible construction so that the volumetric capacity can change to accommodate the changes in fluid volume, yet the reservoirs have heretofore been separate from the terminals and usually required separate mountings. In fact, the common method of providing a reservoir is to place a bellows made of thin copper on a shelf at one side of the terminal proper and connect it to the terminal base with piping.

In many applications including that of electrical precipitation the use of high voltage cables is desirable because of safety, non-interference with radio sets, and the small amount of space required, but the need of a separate fluid reservoir at the terminals has prevented cables from being used to their full possibilities.

In my invention, the reservoir is included in the terminal proper and forms the fluid tight cover for the end of the cable, as can be seen in Fig. 1 wherein a cylindrical bellows 9 surrounding the end of the cable which is shown as being a part of an electrical precipitation installation where high voltage current is used, which application constitutes an important use of my invention. This is represented in a fragmentary view only, but will be recognized by those versed in the art of electrical precipitation.

A high voltage conductor 11 which connects with the cable 1 inside of a terminal insulator 8 enters an inlet bushing 12 which is part of the precipitator, passes up through the interior of a supporting insulator 13 and is fastened to the insulator top 14, upon which a bus bar 15 is fastened and with which it makes electrical contact.

The terminal is shown more in detail in Fig. 3 in which a terminal supporting member 16 carries a mounting member 17 upon which is supported the terminal insulator 8. The reservoir 9 is formed of two concentric bellows, 18, 19, of thin, seamless copper disposed coaxially around the end of the cable 1. The upper end of the outer bellows is soldered to a reinforcing band 20 which is secured to the upper cover member 21 by means of screws 22. The lower end of the outer bellows and lower end of the inner bellows are secured to the bottom cover member 23 by means of reinforcing rings 24.

The upper end of the inner bellows is soldered to a ring 25 which is tapped to receive the threaded end of a pipe 26 through which the cable extends. This pipe extends through an opening in the lower cover member 23 and is screw-threaded to carry a gland 27 including packing 28 and a gland nut 29 for embracing the lead sheath 6 forming a part of the cable.

The lead sheath 6 is cut away from that portion of the cable 1 which extends above the pipe 26 through the terminal insulator 8. The upper end of the cable is secured to an insulator cap as shown in Fig. 7. The insulation 5 is removed from the conductors 2 and 4 and they are soldered in a socket 30 secured to the insulator cap cover 31 by means of a screw 32 extending through a counter-sunk perforation 33 in the cap 31. The depression formed by the countersink is tapped and is closed by a pipe plug 34 to completely close the interior of the insulator.

Coiled springs 35 are secured at each end to points on the peripheries of the upper and lower cover members 21 and 23 in order to resist the movement of the lower cover member 23 away from the upper cover member 21. It will be seen that the lower cover member 23 is supported only by the two bellows 18 and 19 and the coiled springs 35.

A filling tube 36 is secured at one end in a filling opening 37 in the lower cover member 23, and is provided with a valve 38 at the other end. Insulating fluid, such as oil, is introduced under pressure through this tube until there is a sufficient amount to completely fill the cable, the interior of the insulator, the pipe and to completely fill the space between the two bellows while they are being held in a partially extended position. It will be seen that the bellows will be expanded against the resistance of the peripherally disposed springs and that the fluid in the entire system is under pressure. If the volume of insulating fluid in the cable is decreased due to leakage or contraction of the fluid, fluid will be forced from the space between the bellows to make up for this decrease. If the volume of the fluid in the cable is increased due to expansion caused by heat, the fluid will be forced into the space between the bellows and the expansion of the bellows will provide a larger storage space for this excess fluid.

In the various modified forms of the invention, the filling opening 37 is shown as closed merely by a pipe plug 39 but it is obvious that the insulated filling tube can be used with any form of invention.

A modified form of my invention is shown in Fig. 4, in which the high voltage cable 1 enters the base of the terminal through a gland 40 or stuffing box having a gland nut 41 and packing 42. The gland 40 makes a fluid-tight joint with the lead sheath 6 of the cable, the sheath being cut off just above the gland.

The insulation 5 of the cable is carried well up into the terminal insulator 8 but is cut away from the end of the cable conductors 2 and 4 to permit a conducting sleeve 43 to be fastened to it, preferably by soldering. A flexible conductor 44 is soldered to connecting sleeve 43 and also to a hexagonal nut 45 that is fastened to a terminal cover member 46 by means of a screw 47. A pipe plug 48 makes fluid tight the hole in cover member 46 through which screw 47 was introduced. The top member 46 is disassembled from insulator cap 49 to show that the members may be separated so that a wrench can be used to hold nut 45 when screw 47 is tightened. When assembling, two or more screws 50 are used to pull the top 46 down on a gasket 51 on top of insulator 8, which makes a fluid-tight joint.

A cylindrical mounting member 52 surrounds the lower end of and is cemented to insulator 8 and has a flange 53 which is fastened by means of screws 54 to an annular top cover member 55. Between the members is a gasket 56 making a fluid-tight joint. Around the cable is a bellows 57 fastened, as by soldering, to a ring 58 at one end and a second ring 59 at the other end and the rings are clamped against the top cover member 55 and a somewhat similar, annular bottom cover member 60, respectively, to make the bellows a fluid-tight but flexible portion of the fluid chamber enclosing the end of the cable. Gaskets can be used to insure against leakage of fluid. The bottom member 60 has holes 63 spaced around its periphery through which bolts can be passed to hold the member securely against a supporting structure. Because of the flexibility of the bellows 57 and of the connection 44, the top cover member 55 and the insulator 8 can move with relation to the bottom cover member 60 and cable 1.

Several guide rods 64, which are secured to the top cover member 55, are provided for keeping the parts in proper alignment during the movement which will occur as the cable fluid expands, seeps through conductor 4 and insulation 5, and enters the space around the cable and causes expansion of the bellows. Movement in a reverse direction occurs during contraction. The rods 64 are fastened to the top member 55 but slide in openings 65 in a guide member 66 formed integral with the bottom cover member 60. Tension springs 67 are secured to the top cover member 55 and the bottom cover member 60 to hold the container under compression and to resiliently oppose expansion thereof.

To assemble the terminal, the cable is first cut away and properly prepared to fit accommodating parts of the terminal. The bottom member 60 is fastened to a support (not shown) provided for holding the terminal, the gland nut 41 is slipped over the lead sheath 6 and the cable is passed up through the center hole of the gland in the bottom member 60. The insulator 8, with its cap 49 and mounting member 52 cemented in position, is bolted to the top member 55 and the bellows 57 is made a part of this assembly which is placed over the cable end with the guide rods 64 entering the openings 65 in the guide member 66. The cable is so positioned that the connecting sleeve 43 is a few inches below the top of cap 46 and is held in that position by tightening the packing 42 around the sheath 6 through the use of the gland nut 41. The top of the bellows 57 is fastened to the top cover member 55 by means of screws. The nut 45 is pulled up against the cover member 46 with the screw 47 and the top is attached loosely to cap 49. The pipe plug 39 which closes the filling opening in the bottom member is now removed and heated insulating fluid is pumped into the opening so made until it is seen coming out around the loosely fitted top 46. The bellows 57 has been maintained in its extended position, previously determined, during this operation. The cover member 46 is pulled tightly into place, the pipe plug 39 is replaced, and the terminal is ready for the passage of current.

To take current from the top of the terminal it is only necessary to attach a conductor to it and this can be done by fastening the conductor with a screw at the hole 47" tapped in the top member 46.

An embodiment of my invention for use where it is desired to store a large quantity of the insulating fluid is shown in Fig. 5. The device is substantially the same as that shown in Fig. 4, except that the top cover member 55a and the bottom cover member 60a are somewhat larger and the springs 67a are coiled around the guide members 66a inside of the bellows 57a. One end of spring 67a is hooked in aperture 68 in guide member 66a and the other end secured to the bottom cover member 60a by means of a screw 69.

The bottom cover member 60a is provided with three or more lugs having perforations 63a through which attaching bolts (not shown) may be passed to secure the terminal to a supporting means (not shown).

Fig. 6 shows a stuffing gland 70 as a part of the top cover member 71. A gland nut 72 forces packing 73 against lead sheath 6 in a similar manner to that shown in Fig. 3. A passage 74 and other similar passages disposed around the gland 70 permit the flow of fluid between the interior of insulator 8 and the expansible chamber formed by a pair of bellows 75 and 76, top cover member 71 and a bottom cover member 77 through which latter members the cable extends. A spring 78 secured by screws 79 and 80 to the cover members 71 and 77 is in tension and pulls upon bottom member 77 keeping the fluid under compression at all times.

Although I have here shown and described coiled tension springs for contracting the bellows, it is obvious that my invention would be operative equally as well with other means. For instance, I may use compressed air for providing the necessary pressure upon the fluid and for resisting the expansion of the bellows.

In such an arrangement, I employ a rigid cylindrical shell having within it a plurality of joined flexible cells, each filled with compressed air, and having a fluid space around the periphery between the cell and the shell. The expansion of the cells due to the pressure of the compressed air therein provides means for creating a pressure on the insulating fluid and the contraction of the cells due to pressure developed in the cable, on the fluid, provides space for the excess fluid issuing from the cable.

It can be readily appreciated by those familiar with fluid filled cables and terminals that other possible embodiments of my invention are possible. Situations may arise where it will be expedient to mount the extensible means, which may include sliding pistons and other well known devices useful in giving varying volumetric capacities, on the high voltage part of the terminal. Also, where multiple conductor cables are used, it is obvious that the different conductors must be brought out separately and insulated from one another. A terminal with a common base and extendible means, but with a separate insulator for each conductor end, can be used when multiple conductor cables are to be externally connected.

I claim:

1. A cable terminal for a hollow cable comprising a chamber surrounding the cable and in communication with the interior thereof, said chamber having a portion of its surface of rigid insulating material and other portions of its surface being of extensible construction to permit the chamber to have varying volumetric capacity.

2. Apparatus enclosing the end of a fluid-filled high-voltage cable comprising a container for the fluid constituted in part by an insulating bushing and in part by extensible portions which permit the container to have varying volumetric capacity, and means for guiding said extensible portions for movement axially of said cable.

3. A terminal for fluid-filled high-voltage cables comprising a mechanical support, an insulating bushing, and a fluid compartment through which the cable extends, said compartment having extensible wall portions axially adjacent said bushing and capable of relative movement for varying the volumetric capacity of said fluid compartment.

4. A cable terminal comprising a hollow insulator surrounding said cable, an expansible container surrounding said cable and communicating with the interior of said insulator and said cable, means rigidly securing said container to said cable and a conducting cap secured on the end of said insulator and connected to the conductor of said cable.

5. In a terminal for enclosing the end of a fluid-filled cable, the combination with a hollow insulating member and an extensible container that cooperate to provide a chamber for communication with the fluid space within a cable, of means carried by said insulating member for establishing an electrical connection to the conductor within the cable, and means spaced from said insulating member by said container for mechanically connecting the grounded portion of the cable to said terminal.

6. The combination with a fluid-filled cable, of an expansible container surrounding said cable and communicating with the fluid space thereof, said container including means for maintaining a pressure upon fluid within said cable.

7. The combination with a hollow, fluid-filled cable, of expansible chambered means surrounding said cable, and communicating with the hollow portions thereof and means for resiliently opposing the expansion of said expansible chambered means.

8. The combination with a holllow, fluid-filled cable of two opposed annular members disposed about the end of said cable, a bellows connected at its ends to said annular members and surrounding the end of said cable, said members and bellows providing an expansible chamber communicating with the hollow portion of said cable, and means for resiliently opposing the expansion of said bellows.

9. The combination with a hollow, fluid-filled cable of two opposed annular members disposed about the end of said cable, a bellows surrounding the end of said cable and connected at its ends to said annular members to provide an expansible chamber communicating with the hollow portion of said cable, means for resiliently opposing the expansion of said bellows, and an insulating member disposed about the end of said cable and secured to one of said annular members.

10. The combination with a hollow cable, of an expansible chamber surrounding said cable and communicating with the hollow portion thereof, an insulating fluid filling the interior of said cable and entering said chamber, and means securing one portion of said chamber to said cable, other portions of said chamber being movable relatively to said cable as the chamber expands and contracts.

11. The combination with a hollow, fluid-filled cable, of expansible chambered means surrounding a portion of said cable and having the chamber communicating with the hollow portion of said cable, means mounting said chambered means for expansion axially of said cable and securing a portion only of said chambered means to said cable.

12. The combination with a hollow, fluid-filled cable of means including two bellows members of different diameters disposed one within the other and surrounding said cable, said means forming an expansible annular chamber communicating with the hollow portion of said cable, means closing the ends of said chamber and means securing at least one portion of each bellows member with respect to said cable.

13. The combination with a hollow, fluid-filled cable, of means, including an expansible chamber surrounding said cable and communicating with the hollow portion thereof, for storing an excess of fluid, and means securing said first means to said cable, said first means being active upon variation in the length of said cable to accordingly vary the volumetric capacity of said chamber.

14. The combination with a hollow fluid-filled cable, of means, including an expansible chamber surrounding said cable and communicating with the hollow portion thereof, for storing an excess of fluid and means securing said chamber on said cable for expansion and contraction independently of the expansion and contraction of the cable.

In testimony whereof, I affix my signature.

JOHN C. HALE.